United States Patent [19]
Sugiyama

[11] 3,833,233
[45] Sept. 3, 1974

[54] SLEIGH

[76] Inventor: Kenichi Sugiyama, 1236-7-506 Edamachi, Yokohama, Japan

[22] Filed: Jan. 12, 1973

[21] Appl. No.: 323,225

[30] Foreign Application Priority Data
Jan. 17, 1972 Japan.................................. 47-6805

[52] U.S. Cl. ............................................ 280/12.14
[51] Int. Cl. ............................................ B62b 17/06
[58] Field of Search........... 280/12.14, 12.13, 12.12; 115/27

[56] References Cited
UNITED STATES PATENTS

| | | | |
|---|---|---|---|
| 506,080 | 10/1893 | Schaffer | 280/12.13 |
| 559,202 | 4/1896 | Paulson | 280/12.14 |
| 1,281,980 | 10/1918 | Kostewich | 280/12.14 |
| 1,605,743 | 11/1926 | Leniz | 280/12.14 |

FOREIGN PATENTS OR APPLICATIONS

| | | | |
|---|---|---|---|
| 77,400 | 9/1948 | Czechoslovakia | 280/12.14 |

Primary Examiner—Robert R. Song
Attorney, Agent, or Firm—McGlew and Tuttle

[57] ABSTRACT

A sleigh and the like snow vehicle comprises a runner mounting an improved drive and steering structure. The structure has a drive mechanism which includes a vertically movable shaft on which a pair of bladed drive wheels are rotatably for movement therewith so as to cause the blades on the drive wheels selectively to engage and to clear the surface of snow or ice. The structure also has a steering mechanism which includes a gearing operatively connected to a steering rod and steering blades hung from opposite ends of a cross bar pivoted by the gearing.

7 Claims, 9 Drawing Figures

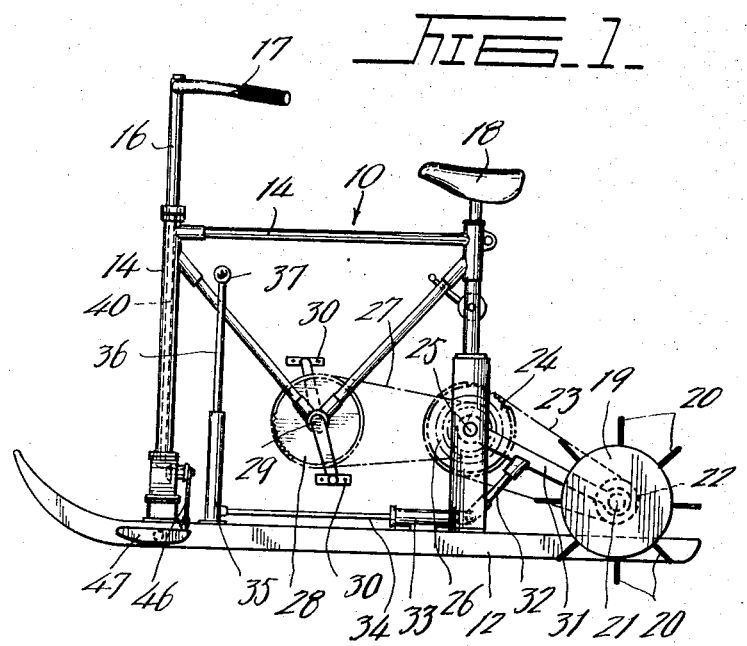
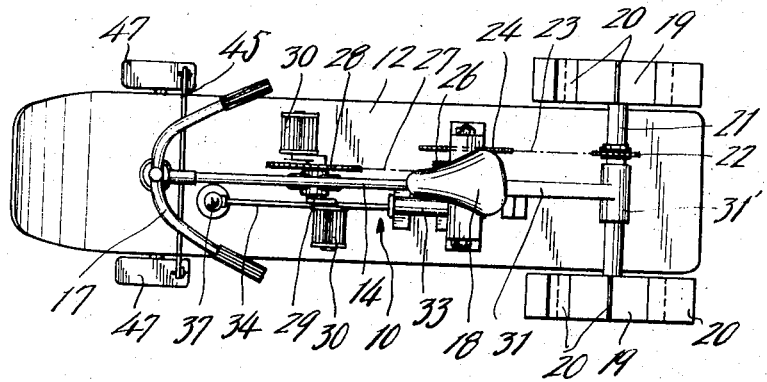

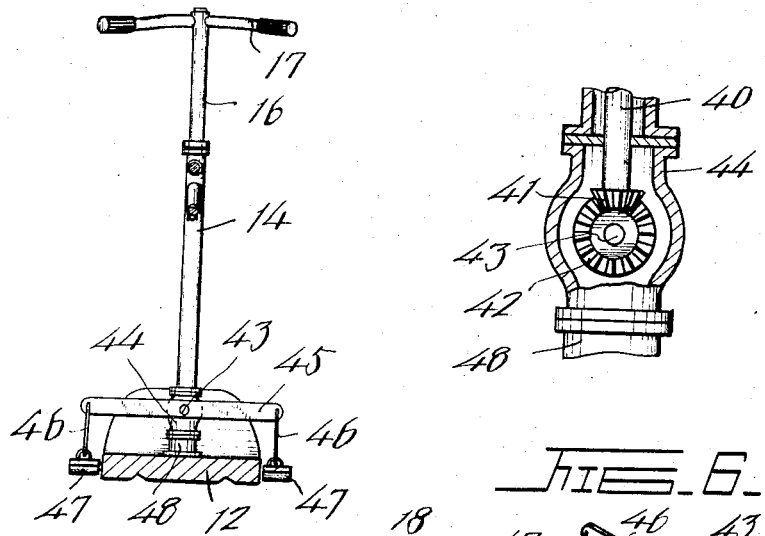
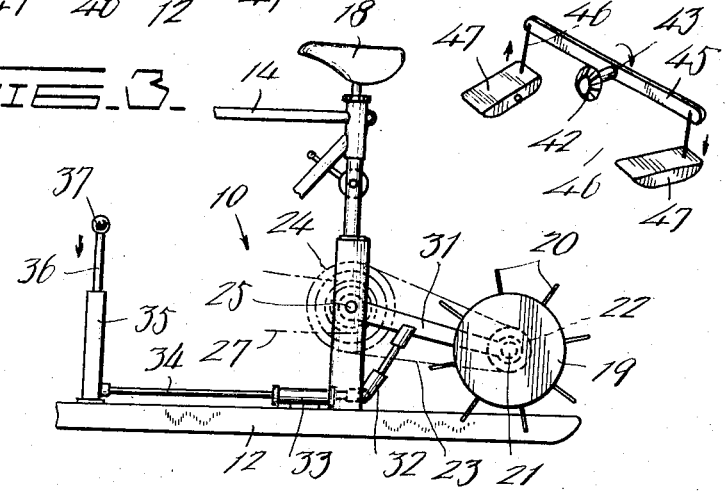
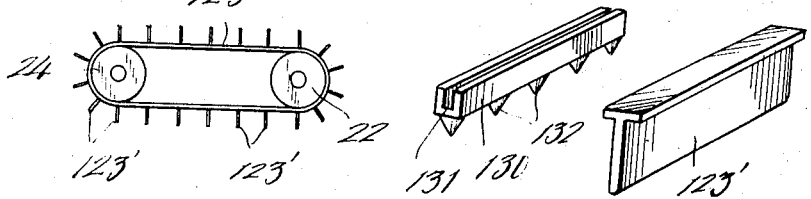

3,833,233

SLEIGH

BACKGROUND OF THE INVENTION

This invention relates to a sleigh or the like snow vehicle and more particularly, to an improved drive and steering structure for sleighs and the like snow vehicles.

Hithertofore, various types of drive and steering structures have been proposed for use in sleighs and the like snow vehicles which are adapted to run along the surface of snow or ice, and one of the most commonly employed prior art drive and steering structures is the chain - belt arrangement. However, the prior art chain - belt type drive and steering structure for a sleigh or the like snow vehicle has no means for adjusting the pressure acting on the snow or ice surface by snow surface contacting means, including the runner of the sleigh, in conformity with particular conditions of the snow or ice surface and, therefore, the snow surface contacting means always contact the snow or ice surface at a predetermined constant pressure regardless of different conditions of the snow or ice surface in spite of the fact that such different snow or ice surface conditions require respectively different contacting pressures.

SUMMARY OF THE INVENTION

Therefore, one principal object of the present invention is to provide a sleigh or the like snow vehicle which incorporates an improved drive and steering structure.

Another object of the present invention is to provide an improved drive and steering structure for a sleigh or the like snow vehicle which is provided with means for adjusting the contacting pressure of snow or ice surface contacting means.

A further object of the present invention is to provide an improved drive and steering structure for a sleigh or the like snow vehicle which is provided with means for raising or lowering snow or ice surface contacting means relative to the surface of snow or ice so as to adjust the contacting pressure of the contacting means.

The above and other objects and attendant advantages of the present invention will be more readily apparent to those skilled in the art from a reading of the following detailed description in conjunction with the accompanying drawings which show one preferred embodiment of the invention for illustration purpose only, but not for limiting the scope of the invention in any way.

BRIEF DESCRIPTION OF THE DRAWINGS

FIG. 1 is a side elevational view of a sleigh embodying the present invention showing the bladed wheels in their operative position;

FIG. 2 is a plan view of the sleigh of FIG. 1;

FIG. 3 is a fragmentary side elevational view of the sleigh showing the bladed wheels in their inoperative position;

FIG. 4 is an end elevational view in partial section showing the steering mechanism of the sleigh;

FIG. 5 is a cross-sectional view on an enlarged scale showing the gearing of the steering mechanism of FIG. 5;

FIG. 6 is a fragmentary perspective view on an enlarged scale of steering blades and their mounting structure;

FIG. 7 is a side elevational view of a modified form of drive belt arrangement employing a bladed endless belt; and FIGS. 8A and 8B are fragmentary perspective view on an enlarged scale showing, respectively, an attachment for the modified form of drive belt arrangement of FIG. 7 and one of the blades of the bladed belt of FIG. 7.

PREFERRED EMBODIMENT OF THE INVENTION

The present invention will be now described referring to the accompanying drawings and, more particularly, to FIGS. 1 through 6 inclusive thereof which show one preferred embodiment of the invention in the form of a sleigh with the sleigh being generally indicated with reference numeral 10. The sleigh 10 is designed to be suitably employed for sports and physical training and thus has a construction substantially similar to a bicycle. The sleigh 10 generally comprises a base member or runner 12, which slides on the surface of snow or ice and on which various parts of the sleigh are mounted, and a tubular framework 14 fixedly mounted on the runner 12 and including a pair of fore and rear portions which extend uprightly from the upper surface of the runner at right angles thereto and a horizontal portion extending between and secured to the two upright portions at positions adjacent to the upper ends of the upright portions. The upright framework portions have extensions which incline downwardly and convergently from the inner sides of the associated framework portions at an angle with respect to the latter and are joined together at the lower ends. A steering bar 16 extends through the fore framework portion with the upper portion of the bar extending beyond the associated framework portion. The upper end of the steering bar 16 has a pair of handles 17 fixedly secured thereto. A saddle 18 is fixedly secured to the upper end of the rear upright framework portion on which a sleigh driver seats. A pair of driving or bladed wheels 19, which constitute the principal components of the drive mechanism, are provided on opposite sides of the runner 12, and each of the wheels has a plurality of angular spaced blades 20 extending from its periphery. The bladed wheels 19 are supported and rotated by means which will be described hereinafter, and are also movable between a lower or operative position, in which the blades 20 engage the snow surface, and an upper or inoperative position in which none of the blades engage the snow surface. A transverse shaft 21 extends between the two bladed wheels 19 and rotatably support the wheels at the opposite ends thereof. A sprocket wheel 22 is fixedly mounted on the shaft 21 between the bladed wheels 19 and an endless chain 23 is trained over the sprocket wheel 22 and is also trained over another sprocket wheel 24 which is mounted on a transverse stub shaft 25 which is, in turn, supported in and extends laterally of the rear upright framework portion. The stub shaft also supports a smaller diameter sprocket wheel 26 over which another endless chain 27 is trained and chain 27 is also trained over a further sprocket wheel 28 which is fixedly mounted on a rotary shaft 29 which is journalled in the junction between the converging lower ends of the extensions of the upright framework portions and which has, at the opposite ends, a pair of pedals 3o which are staggered to each other.

A stay 31 extends transversely between the shafts 21 and 25 and has, at one end, a sleeve 31' which is loosely fitted on the shaft 21 and at the other end another sleeve (not shown) loosely fitted on the shaft 25. A stay manipulation rod 32 is provided between the shafts 21 and 25 and has one end operatively connected to the stay 31 and the other end pivotally connected to a horizontal cylinder-piston unit 33 which is in communication with a hollow horizontal hydraulic pressure applying unit 34 which is in turn connected to a plenum chamber defined by an upright tube 35 and a manipulation rod 36 which is telescopically and sealingly received in the tube 35 for movement between the extended position and retreated position. A knob 37 is provided at the top end of the rod 36 to be manually operated for reciprocating the rod in the tube 35. As will appear, when the knob 37 is gripped and pushed down, the manipulation rod 36 moves into the tube 35 thereby to apply the pressure within the tube 35 to the fluid within the pressure applying unit 34 which then applies the hydraulic pressure to the piston of the cylinder-piston unit 33 to extend the piston rod. The extended piston rod causes the stay 31 to pivot upwardly thereby to raise the shaft 21 until the blades 20 on the bladed wheels 19 clear the surface of snow, as shown in FIG. 3. When the knob 37 is released, the rod 36 is allowed to extend from the tube 35 and the pressure applied on the fluid within the unit 34 is released thereby to allow the piston rod to retract into the cylinder so as to pivot the stay 31 downwardly until the shaft 12 is lowered to the position as shown in FIG. 1, and thus the blades 20 on the bladed wheels 19 come to engage the snow surface again.

Now the steering mechanism for the sleigh will be described referring to FIGS. 4 through 6 inclusive. The steering mechanism includes the above-mentioned rotatable steering bar 16, received in the fore upright framework portion, and steering handles 17. The steering mechanism further comprises a transmission bar 40 rotatably received in the fore framework portion and having its upper end secured to the lower end of the steering bar 16, a bevel gear 41 secured to the lower end of the transmission bar 40, a beveled ring gear 42 mounted on a cross shaft 43 and meshing with the bevel gear 41, the bevel gear, ring gear and cross shaft being housed in a gear box 44 which is connected to the lower end of the fore framework portion, a cross bar 45 in the center of which the cross shaft 43 is fixedly received and which has at the opposite ends the upper ends of a pair of downwardly extending swingable links 46 secured thereto, and a pair of steering blades 47 hung from the links 46 on the opposite sides of the runner 12. The lower end of the gear box 44 is fixedly secured to a seat 48 secured to the runner 12 by suitable fastening means.

When the sleigh 10 as illustrated runs on a plane or uphill snow surface, the shaft 21 is lowered down so that the blades 20 on the bladed wheels 19 may engage the snow surface to impart a drive force to the sleigh, as shown in FIG. 1 whereas, when the sleigh runs on a downhill snow surface, since the sleigh can slide downhill by its own gravity and the blades offer resistance against the sliding of the sleigh, the shaft 21 is raised up to clear the blades 20 from the snow surface, as shown in FIG. 3.

FIG. 7 shows a modification of the endless belt 23 in the foregoing embodiment and this modified endless belt 123 has a plurality of spaced blades 123' in the outer surface. FIG. 8A shows an attachment 130 for each of the blades 123' shown in FIGS. 7 and 8A and the attachment has a groove 131 on the top for receiving the lower end portion of a blade 123' and a plurality of spaced spikes 132 on the under surface. The attachment 130 is employed when the sleigh 10 runs on the surface of ice and, in use, the spikes 132 engage the ice surface to accelerate the sleigh. When the sleigh has reached a predetermined speed, the shaft 22 which supports the sprocket 22 on which the modified endless belt 123 is trained is raised so as to lift the spikes 132 from the ice surface whereupon the sleigh is allowed to run by its own inertia force.

Although the best mode contemplated for carrying out the present invention has been herein shown and described, it will be apparent to those skilled in the art that various modifications and variations may be made without departing from what is regarded to be the subject matter of the invention.

What is claimed is:

1. A sleigh or the like snow vehicle comprising, in combination, a runner; a tubular frame work mounted on said runner and including two vertical elements, a horizontal element interconnecting the upper ends of the vertical elements, a pair of downwardly converging inclined elements connected to said vertical elements and means interconnecting the lower ends of said inclined elements; a drive mechanism supported on said frame work and including a driving crank shaft rotatably mounted in said interconnecting means and having pedals mounted on each of its opposite crank arms, an intermediate shaft rotatably mounted in one of said vertical elements, and a driven shaft; said drive mechanism further including a drive sprocket secured to said driving crank shaft; first and second intermediate sprockets secured to said intermediate shaft, a driven sprocket secured to said driven shaft, a first endless chain interconnecting said drive sprocket and said first intermediate sprocket, and a second endless chain interconnecting said second intermediate sprocket and said driven sprocket; a support movably mounted on said one vertical element and rotatably mounting said driven shaft; rotatable paddle drive means secured to said driven shaft for rotation thereby to drive said sleigh; sid support being movable in a vertical plane to engage said paddle drive means with snow or the like or to retract said paddle drive means to an inoperative position; a hydraulically actuated piston-cylinder unit mounted on said runner; a link connecting the piston of said unit to said support; a generally upright air cylinder communicating with the cylinder of said piston-cylinder unit; a manually actuable piston member reciprocable in said air cylinder and operable to increase and decrease the pressure in said air cylinder to correspondingly extend and retract the piston of said hydraulic piston-cylinder unit to extend and retract said link to correspondingly elevate and lower said support and said rotatable paddle drive means; and a steering mechanism including a steering rod assembly rotatably mounted in the other vertical element and runner steering elements operable by said steering rod assembly.

2. A sleigh or the like snow vehicle, as claimed in claim 1, in which said steering rod assembly comprises a steering rod extending upwardly from said other vertical element; handle bars on said steering rod operable to turn said steering rod; a stub shaft rotatably mounted in said other vertical element adjacent the lower end thereof; a cross bar secured, intermediate its ends, to said stub shaft; a pair of steering blades each suspended from a respective opposite end of said cross bar adjacent a respective opposite side of said runner; and gearing interconnecting said steering rod and said stub shaft to oscillate said cross bar to raise one steering blade and lower the other steering blade.

3. A sleigh or the like snow vehicle, as claimed in claim 2, in which said rotatable paddle drive means comprises a pair of bladed wheels secured to respective opposite ends of said driven shaft and disposed on respective opposite sides of said runner.

4. A sleigh or the like snow vehicle, as claimed in claim 2, in which said paddle drive means comprises at least one endless belt having blades projecting from its exterior surface and driven by said driven shaft.

5. A sleigh or the like snow vehicle, as claimed in claim 2, including respective links connecting each steering blade to the associated opposite end of said cross bar.

6. A sleigh or the like snow vehicle, as claimed in claim 2, in which said paddle drive means comprises blades engageable with snow and the like; and ice gripping attachments interchangeably engageable with said blades; each attachment comprising a channel member arranged to releasably grip the associated blade and having ice-engaging prings projecting from the outer surface of its base.

7. A sleigh or the like snow vehicle, as claimed in claim 2, in which said support is oscillatably mounted, at one end, on said intermediate shaft; said driven shaft being rotatably mounted in the free end of said support.

* * * * *